Dec. 29, 1936.  E. T. MURPHY ET AL  2,066,013
APPARATUS FOR PRESERVING PERISHABLES
Filed May 24, 1933  4 Sheets-Sheet 1
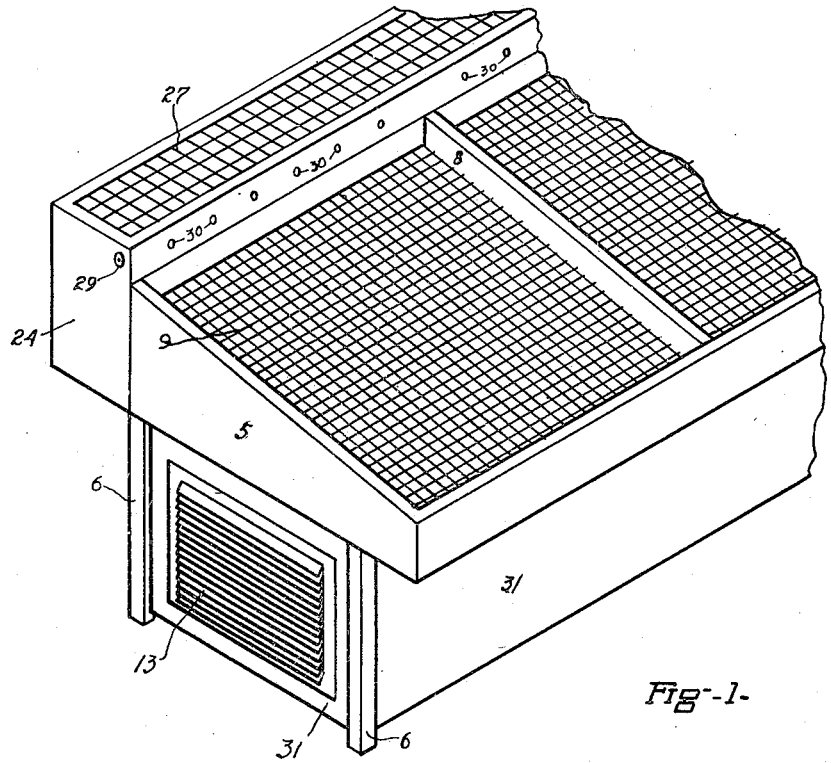
Fig-1-
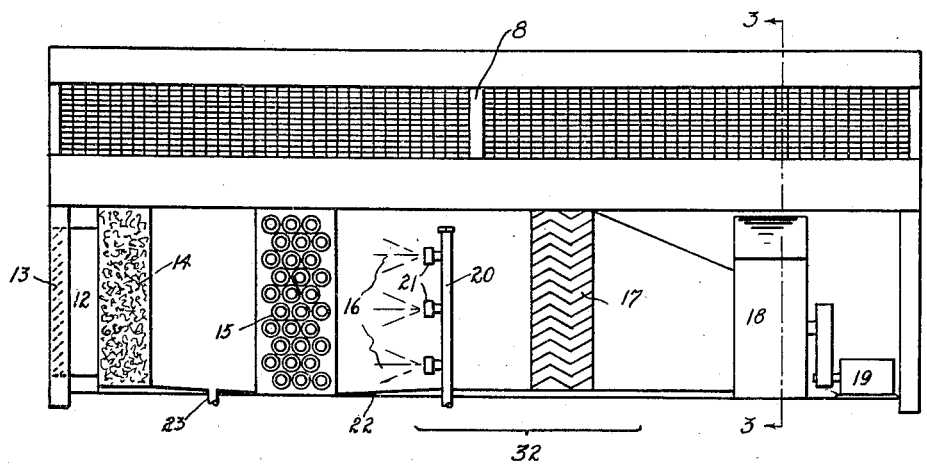
Fig-2-
INVENTOR.
Edward T. Murphy & Arthur E. Meling
BY
ATTORNEY

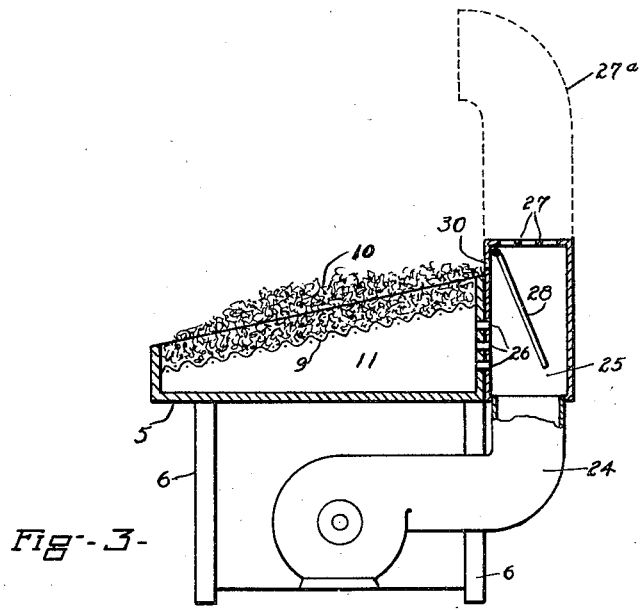
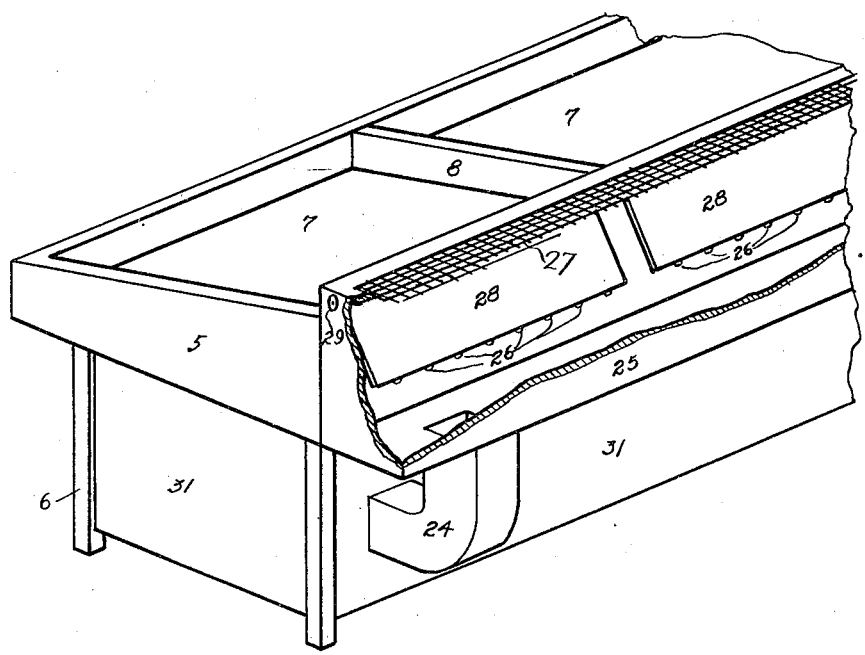

Dec. 29, 1936. E. T. MURPHY ET AL 2,066,013
APPARATUS FOR PRESERVING PERISHABLES
Filed May 24, 1933 4 Sheets-Sheet 3
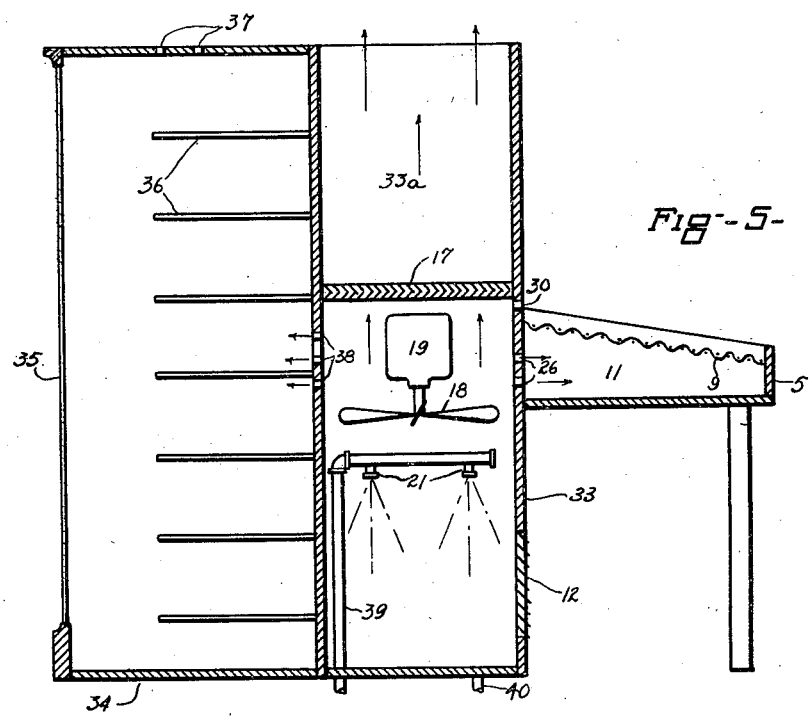
Fig-5-
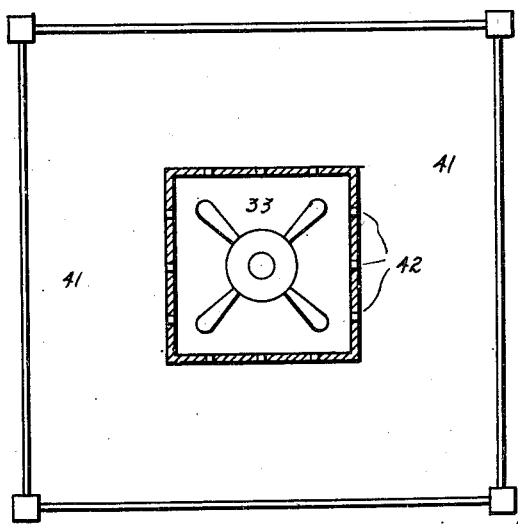
Fig-6-
INVENTOR.
Edward T. Murphy & Arthur E. Meling
BY /Herman Feil/
ATTORNEY Dec. 29, 1936.   E. T. MURPHY ET AL   2,066,013
APPARATUS FOR PRESERVING PERISHABLES
Filed May 24, 1933   4 Sheets-Sheet 4
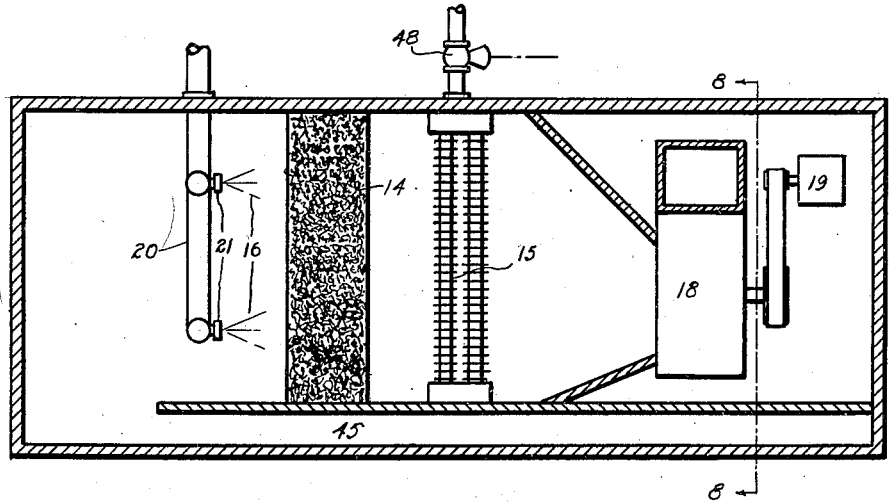
Fig-7-
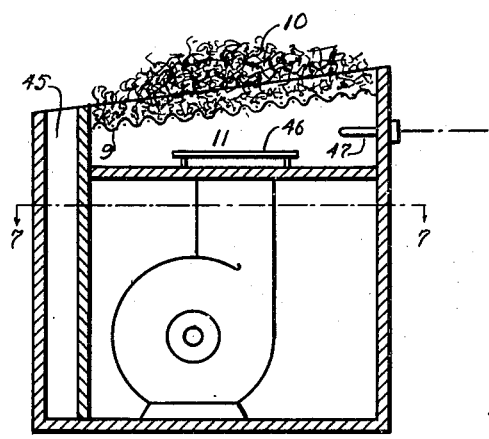
Fig-8-
INVENTOR.
Edward T. Murphy & Arthur E. Meling
BY
ATTORNEY Patented Dec. 29, 1936

2,066,013

UNITED STATES PATENT OFFICE 2066,013

APPARATUS FOR PRESERVING PERISHABLES

Edward T. Murphy, Chicago, and Arthur E. Meling, Evanston, Ill., assignors, by mesne assignments, to Carrier Corporation, Newark, N. J., a corporation of Delaware Application May 24, 1933, Serial No. 672,548

3 Claims. (Cl. 62—89.5)

This invention relates to the conditioning and distribution of air utilized in enclosures such as stores, where merchandising or trading is usually carried on, and more particularly, to a method of and means for conditioning a volume of air, one portion of which is utilized to preserve or condition products subject to deterioration, and another portion utilized to make the atmosphere more comfortable to people in the enclosure.

The general object of the invention is to provide for furnishing air of proper temperature and moisture content to products displayed openly on counters or within show cases or the like, at the same time supplying air free of entrained moisture to the atmosphere surrounding such counters and display devices.

In merchandising perishable products, for example vegetables and fruits, it has been found that unless the product is kept in a moist cool atmosphere, it may soon deteriorate and become unsaleable. In an attempt to provide moisture, grocers usually sprinkle the produce, and at the end of the day place the unsold portion in a refrigerator. Such methods, at best of makeshift character, very often do more harm than good, since the free moisture on the products is often warm in temperature, frequently makes the produce a dust catcher and its uneven distribution is made without regard to the different character of different classes of produce. For example, while some vegetables require very moist atmospheres, other vegetables require coolness with relatively less moisture. Relative humidity of an atmosphere necessary to preserve spinach, if applied to berries, might cause scale and mold thereon. Furthermore, the placing of unsold portions in a refrigerator having a cold, dry atmosphere causes vegetables, for example, to lose moisture and become very dry, thereby affecting their taste and keeping quality. Another object of the invention, therefore, is to avoid such disadvantages and provide a method of conditioning vegetables while on display, which will preserve them and keep them in saleable and useable condition for a comparatively long period of time.

A further object of the invention is to provide a method of conditioning produce which will enable air laden with free moisture or without free moisture, to be deposited, as desired, upon different classes of produce.

A feature of the invention provides for a combination of display devices with air conditioning apparatus, enabling the conditioning of produce accommodated by the devices and the atmosphere surrounding the devices by a unified arrangement of apparatus making for great saving in floor space.

A further feature resides in supplying conditioned air to a vegetable counter, for example, so that the air may percolate upwardly through produce on the counter.

Another feature provides for supplying conditioned air to a display device for produce so that the air will be discharged through and over the produce.

Another feature provides for controlling and diffusing the discharge of conditioned air to a display counter whereby a blanket of air will be formed over produce on the counter.

A further feature provides for returning air from a layer of conditioned air used for preserving perishable produce, to a conditioning apparatus utilized for providing and maintaining the layer of air.

Another feature provides for dividing a volume of conditioned air so that one portion of certain temperature and of desired free moisture content will be supplied for the preservation of produce, and another portion, without free moisture therein, will be supplied to the outer atmosphere above the heads of the people in the enclosure served.

A further feature resides in dividing a display portion of a counter into a plurality of compartments or areas, and individually supplying each compartment with conditioned air in controlled quantities.

A further feature provides for the utilization of a portion of a display counter as an air discharge means whereby conditioned air may be delivered directly into the enclosure wherein the display counter is located, for conditioning the atmosphere thereof for human comfort.

Still another feature provides for controlling the temperature of the produce conditioning medium.

Further features, making for maximum utility and economy, and providing novel arrangements of air conditioning means in combination with display devices, will be more apparent from the following description of the invention to be read in connection with the appended drawings showing illustrative methods of carrying out the invention.

Fig. 1 is an isometric fragmentary view of a portion of a vegetable display counter adapted to embody the invention;

Fig. 2 is an elevation of the counter of Fig. 1, the front cover plate having been removed to show the arrangement of the conditioning equipment;

Fig. 3 is a sectional elevation of the apparatus of Fig. 2 taken on the line 3—3, plus a duct arrangement for distributing air to the atmosphere surrounding the apparatus;

Fig. 4 is an isometric view of the counter of Fig. 1 from the rear thereof, a portion of the air distributing conduit being broken away to show the interior thereof, and the screen of the display portion being removed;

Fig. 5 is a sectional diagrammatic view of a combination show case and display counter served by an integral conditioning apparatus adapted additionally to condition the surrounding atmosphere;

Fig. 6 is a plan view, in section, of another arrangement of a display device in combination with a conditioning unit, in accordance with the invention;

Fig. 7 is a sectional plan view, taken on line 7—7 of Fig. 8, illustrating another form of the invention; and Fig. 8 is an elevation, partly in section, taken on line 8—8 of Fig. 7.

Considering the drawings, similar designations referring to similar parts, 5 represents generally a produce display counter mounted on supporting legs 6. The counter 5 may be divided into a plurality of compartments 7 as by partitions 8. Screens or perforated plates 9 cover the compartments, and as is most clearly seen in Figs. 1 and 3, they form a support for produce 10 in the upper part of the compartments. The screens 9, in combination with the produce stored thereon, the walls of the cabinet and a suitable fan, provide plenum spaces 11 therebelow. The term "plenum space" is to be understood to mean a space in which air pressure is greater than that of the ambient atmosphere.

An air conditioning unit 32 is mounted beneath counter 5, as shown in Figs. 1 to 4, in what is usually waste space. The unit 32 comprises an air inlet 12 covered by louvres 13, air filter 14, cooling coil 15, sprays 16, eliminators 17, fan 18, and a fan motor 19. Filter 14 may be of any type and, as illustrated, may be a dry mechanical filter of well known design. Cooling coil 15, preferably comprising a plurality of tubes having extended surface formed thereon, is adapted to receive refrigerant, either in liquid or gaseous form, from any desired source under suitable control. Sprays 16 are produced by the flow of water from any suitable source through pipe 20 and nozzles 21. The eliminators 17, of usual design and construction, are adapted to remove any entrained free moisture from air passing therethrough. The lower casing 22 of the unit is sloped, as illustrated, to form a trough beneath coil 15 and sprays 16 in order that water from the sprays or water condensed from the air by cooling coil 15 may drain by gravity and be removed through discharge pipe 23. Panels 31, supported by legs 6, enclose the unit and lend a neat and finished appearance to the counter.

In operation, air is intaken by fan 18 through inlet 12, cleaned by filter 14, cooled and dehumidified by coils 15, or humidified by sprays 16, and discharged by the fan through duct 24 into distributing conduit 25. Whether the air is to be cooled and dehumidified or whether it is to be humidified only (or humidified and heated) depends on the condition of the entering air. During the summer months, it is usually desirable to cool and dehumidify, whereas in winter, and during the intermediate seasons, it may be necessary to humidify. If desired, the cooling coils need not be provided, and the sprays alone supplied with water of desired temperature, either for dehumidification or humidification.

Distributing conduit 25 is constructed on the back of counter 5 and extends longitudinally thereof. A plurality of ports 26 provide passageways for conditioned air, from conduit 25 to plenum spaces 11 in compartments 7. As can best be seen from Fig. 4, each compartment 7 is provided with an individual group of ports 26 in order that each compartment may be individually supplied with air. An open grille 27 forms the top of conduit 25 to provide means for discharging conditioned air directly into the enclosure in which counter 5 is located. If desired, one or more discharge ducts 27a may be connected to conduit 25 for discharging air into the enclosure above the heads of people congregated therein. To proportion the conditioned air between the produce compartments 7 and the outlets to grille 27 or ducts 27a, and to vary the quantity of air supplied to each compartment, dampers 28 are provided, one for each compartment. Hand wheels 29, or the like, provide a ready means of adjustment for the individual dampers. In the counter herein illustrated and described, applicants show only two compartments. Hence, hand wheels 29 are provided at opposite ends of the counter directly connected to the individual dampers 28, for the operation thereof. If the counter is to contain more than two compartments, then the hand wheels for separate dampers (one damper for each compartment) may be mounted on the top of duct 25, or at any other desired place; and any well known mechanism such as a cam, or a gear drive, may be utilized for the operation of the individual dampers. While hinged dampers are illustrated, any other type may be used, as, for example, slide dampers.

In operation, air from conduit 25 will flow through ports 26 and, assuming that there is produce on the counter, will tend to build up a slight pressure in plenum space 11. The conditioned air, either cooled and dehumidified, or humidified, will percolate upward through screen 9 and the produce 10 thereon, thereby conditioning and preserving the produce. By causing a slight pressure to be built up in the plenum spaces 11, a complete and uniform distribution of air throughout the entire compartment and over the produce is secured.

Whether the air be dehumidified or humidified, it is apparent that its condition at the fan discharge approaches saturation. By means of dampers 28, the quantities of air fed to different compartments may be varied. This will not only affect the degree of cooling in different compartments, but also serve to control the relative humidity conditions therein. This is due to the reheating effect imparted to the conditioned air by the produce itself. Thus, if the amount of conditioned air fed to a compartment is reduced in volume, the reheating effect will be greater, and this will result in a greater reduction in relative humidity of the conditioned air, than when a large volume is subject to the reheating effect of the same amount of produce.

In preserving some products, it may be desirable to discharge conditioned air across the products; and in such cases, discharge ports 30 (Figs. 1 and 3) from conduit 25 may be utilized. In still other cases, a combination of the two methods may be used, that is, some of the conditioned air may be percolated up through the product and another portion of the air blown across it.

In either case, the clean conditioned air is always tending not only to preserve the product, but also to keep it in a most sanitary condition. Whether the air is discharged up through the produce and/or across it, the air acts to prevent any dusty or germ-laden air in the enclosure from coming into contact with the product.

Unless damper 28 is set to prevent such discharge, some of the air, as shown in Fig. 3 and as will be seen in connection with Figs. 5 and 6, will be discharged directly into the enclosure to condition the atmosphere therein. By discharging the air vertically upward, as through grille 27, and at a relatively high velocity, the conditioned air is caused to mix with room air and be attempered thereby before coming into contact with occupants of the enclosure. If desired, one or more ducts 27a may extend from conduit 25 to a point above the zone of occupancy of the enclosure and discharge the air horizontally or in any other prescribed direction.

Fig. 5 illustrates another application of the invention in which a conditioning unit 33 is combined with a display counter 5 and a show case 34. The counter is of the same general type as illustrated in Figs. 1-4 and the show case may be of suitable design having a glass front 35 and suitable shelves or display racks 36. The shelves are preferably positioned in staggered relation one to another, so that air may circulate freely throughout the show case and be exhausted through ports 37 in the top of the case. The counter is equipped with a series of ports 26 for admitting air from the conditioning device to plenum space 11 and may also have a series of ports 30 for discharging air, if desired, over produce positioned upon screen 9. Ports 38 lead from the conditioning unit 33 to the show case. Conditioned air from unit 33 is supplied directly to the enclosure in which the counters are positioned through duct 33a. Thus, the enclosure, as well as the produce, is conditioned. The unit itself may be combined with the show case and counter, as illustrated in Fig. 5, or may be a separable unit forming an "island" around which may be positioned show cases and counters served thereby. In the form illustrated in Fig. 5, the unit has a motor 19 for operating a fan 18 which admits air through inlet opening 12. Spray nozzles 21 are fed through supply pipe 39 which obtains water of desired temperature from any suitable source. For cooling and dehumidification, a suitable source of refrigerated water would be supplied by refrigerating equipment and the auxiliaries such as pumps for supplying the water to supply pipe 39 and sprays 16 may be of usual design and hence, are not illustrated. A return pipe 40 is provided for draining the water from the unit and returning it to the source of supply where it may be reused as desired, or drained to a waste. Eliminators 17 are positioned so that the air fed through ports 26, 30 and 38 will not be relieved of such free moisture as it acquires during its passage through the sprays. Of course, eliminators may be provided so that air fed through ports 38, for example, or through all the ports, will have the free moisture therein removed. However, where it is desired to deposit moisture on vegetables, or on other produce, the eliminators may be placed so that free moisture will be supplied with the air to display areas and only the air supplied to the room will have the free moisture eliminated. In Fig. 5, such air as is supplied to the room passes through eliminators 17 and then is discharged upwardly to the surrounding atmosphere. The height of the arrangement is such that the air will be delivered above the zone of occupancy and mix with air in the upper part of the room before reaching the breathing zone. Any suitable damper arrangement may be provided for proportioning the volume of air fed to the counter, show case and surrounding atmosphere.

In Fig. 6, an "island" arrangement is shown in which a central unit 33 is surrounded on all sides by a display device 41. The display device 41 may be substantially identical with the show case of Fig. 5, except that it completely surrounds the unit 33. Thus, the device 41 may have a plurality of shelves similar to shelves 36 of Fig. 5, for supporting merchandise therein, and a plurality of ventholes in the top thereof similar in all respects to the ventholes 37 of Fig. 5. The display device 41 is preferably mounted on supporting legs at a height of several inches or more above the floor level. Thus, an air inlet may be provided at the bottom of the conditioning chamber, suitable baffle means being provided to prevent the escape of water from the conditioning chamber in a manner well known in the art. Conditioned air treated by apparatus such as shown in Fig. 5 will be discharged through ports 42 (corresponding to ports 38 of Fig. 5) to the surrounding display areas in the show case or counter arrangement 41 and some of the air will flow upwardly from unit 33 to the atmosphere of the enclosure in which the arrangement is located. For different purposes, a conditioning unit may be combined with any desired series of counters and display cases, in order best to serve the conditioning needs of different classes of produce, as well as the atmospheric conditions of enclosures in which the counters and display cases are located.

Figs. 7 and 8 show an apparatus in which the parts have been rearranged to the end that the air may be more effectively conditioned, and the cost of conditioning materially reduced.

The rearranged conditioning unit comprises an inlet duct 45, sprays 16, air filter 14, cooling coils 15, and fan 18. In operation, air to be conditioned is first subjected to the action of sprays 16, whereby the air is humidified to a degree approaching saturation. Filter 14 serves the dual purpose of removing dirt and entrained moisture from the air. Cooling coils 15 are adapted to cool and dehumidify the air to any desired degree. By humidifying the air to the greatest possible degree, and then cooling it, a condition of practically one hundred per cent saturation is achieved, an exceedingly difficult thing to accomplish in practice. Further, this is accomplished without materially affecting the cost of operation of the device.

Fan 18 discharges the cold conditioned air into plenum chamber 11. A pan, or baffle, 46 is provided to prevent the direct discharge of air against produce 10. Such baffle or similar structure may be variously positioned with respect to the discharge from the fan to break up and diffuse the discharged air. As was explained in connection with Figs. 1-4, a slight pressure is built up in plenum 11 to cause an even distribution of air throughout the entire plenum which filters through and blankets the product. Thermostat 47, located in plenum chamber 11, is adapted to operate valve 48 which admits cooling fluid to coils 15. Thus, the amount of cooling done by coil 15 is varied in accordance with changes in temperature within the plenum, which reflects the temperature of the produce zone.

As is well known, cold air is denser, heavier per unit volume, than warm air. Even in those cases in which the counter is located within a conditioned enclosure, the cold saturated air supplied to the produce is more dense than the air of the surrounding atmosphere. The air, after percolating through the produce, forms a layer, or strata, just above it. This layer, due to gravity, falls toward the front of the inclined counter. Applicant takes advantage of this action by placing the air inlet to the conditioner at the front edge of the counter. Hence, the layer of cold air rolls down the counter, into air inlet 45 and is drawn back to the conditioner for reuse. By reusing this cold air, instead of conditioning warmer room or outside air, the refrigeration requirements of the unit are very considerably reduced.

While this last described arrangement is shown applied to the unit of Figs. 7 and 8, it can as well be applied and its application is contemplated to combine produce and atmospheric conditioning units, as those, for example, illustrated in Figs. 1 to 4.

While applicant has shown certain features in connection with specific figures, it is not intended that the use of such features be limited to the arrangement of the particular features, since they can as well be employed with the arrangements of the other figures and in structures of the same general character, for similar purposes.

While illustrative embodiments of the invention are shown, it is intended that any similar arrangement shall be deemed within the scope of the invention wherein conditioned air is used in part to preserve produce such as vegetables, fruits, candles, etc., and in part to condition the atmosphere of an enclosure for the promotion of human comfort.

What we claim is:

1. In a display device for perishable products, a compartment having its upper edges sloping from the back towards the front thereof, means within said compartment for supporting produce at an angle to the horizontal, an air conditioning unit for supplying air upwardly through the produce, and an air inlet for said conditioning unit formed along the lower edge of said compartment whereby the cold conditioned air may flow by gravity down the sloping surface presented by the produce into said air inlet.

2. In a display device for perishable products, a compartment having its upper edges sloping from the back towards the front thereof, produce supporting means within said compartment, said supporting means being mounted substantially parallel to the edges of said compartment for holding the produce in a sloping position, an air conditioning unit for discharging air upwardly through the produce on said supporting means, and an air inlet for said conditioning unit formed along the front edges of said compartment whereby the cold conditioned air may flow by gravity along the sloping surface of the produce into said air inlet.

3. In a display device for perishable products, a compartment, a produce supporting rack mounted within said compartment and adapted to support produce mounted thereon in such manner as to present a surface which slopes downwardly toward an edge of the compartment, means for discharging conditioned air upwardly through said produce, and an air inlet formed along said edge of the compartment toward which the produce surface slopes downwardly, whereby the cold conditioned air may flow by gravity down the sloping surface of the produce into said air inlet.

EDWARD T. MURPHY.
ARTHUR E. MELING.